United States Patent
Sugimoto et al.

(10) Patent No.: US 11,964,688 B2
(45) Date of Patent: Apr. 23, 2024

(54) TOUCH DETECTION DEVICE

(71) Applicant: KABUSHIKI KAISHA TOKAI-RIKA-DENKI-SEISAKUSHO, Aichi-ken (JP)

(72) Inventors: Ryohei Sugimoto, Aichl (JP); Yoshiki Hanta, Aichi (JP); Hiroo Kawai, Aichi (JP)

(73) Assignee: KABUSHIKI KAISHA TOKAI-RIKA-DENKI-SEISAKUSHO, Niwa-gun (JP)

( * ) Notice: Subject to any disclaimer, the term of this patent is extended or adjusted under 35 U.S.C. 154(b) by 17 days.

(21) Appl. No.: 17/958,681

(22) Filed: Oct. 3, 2022

(65) Prior Publication Data

US 2023/0104497 A1   Apr. 6, 2023

(30) Foreign Application Priority Data

Oct. 5, 2021   (JP) .................................. 2021-164322

(51) Int. Cl.
 *B62D 1/04* (2006.01)
 *G06F 3/041* (2006.01)
 *G06F 3/044* (2006.01)

(52) U.S. Cl.
 CPC ....... *B62D 1/046* (2013.01); *G06F 3/041662* (2019.05); *G06F 3/0448* (2019.05)

(58) Field of Classification Search
 None
 See application file for complete search history.

(56) References Cited

U.S. PATENT DOCUMENTS

2010/0137702 A1* 6/2010 Park ........................ A61B 5/318
                                                          600/509
2019/0210629 A1* 7/2019 Kwon .................... G06F 3/0448

FOREIGN PATENT DOCUMENTS

JP          2019023012          2/2019

* cited by examiner

*Primary Examiner* — Vicky A Johnson
(74) *Attorney, Agent, or Firm* — Dority & Manning, PA (57) ABSTRACT

A touch detection device that includes: a steering body; a sensor electrode provided at the steering body and having an electrostatic capacitance; and a measurement control section configured to: measure the electrostatic capacitance of the sensor electrode over a measurement cycle according to a measurement frequency and to output a detection value according to values measured by setting the measurement frequency to 50 Hz or 60 Hz for removal target frequencies of 50 Hz and 60 Hz, set the measurement cycle and a period for calculating a segment average of the measurement values based on the measurement frequency, and set an interval between adjacent averaging segments for calculating the segment average such that one segment average value is suppressed by another segment average value for 50 Hz and 60 Hz frequency components, and output an averaged measurement value for the two averaging segments as the detection value.

4 Claims, 5 Drawing Sheets

SEGMENT AVERAGE VALUE $Q_k$

TIME (s)

FIG.6B

AVERAGED MEASUREMENT VALUE

TIME (s)

TOUCH DETECTION DEVICE

CROSS-REFERENCE TO RELATED APPLICATION

This application is based on and claims priority under 35 USC 119 from Japanese Patent Application No. 2021-164322 filed on Oct. 5, 2021, the disclosure of which is incorporated by reference herein.

BACKGROUND

Technical Field

The present disclosure relates to a touch detection device.

Related Art

A steering wheel unit of Japanese Patent Application Laid-Open (JP-A) No. 2019-023012 includes an electrostatic capacitance sensor provided to a steering wheel, with the electrostatic capacitance sensor connected to a contact determination device. The contact determination device compares a detection value of electrostatic capacitance of the electrostatic capacitance sensor against a contact determination threshold to perform contact determination. In a non-contact state of the steering wheel, a moving average is computed in the contact determination device for values detected of a specific number of times including the current electrostatic capacitance detection value of the electrostatic capacitance sensor, and the contact determination threshold is corrected using the computed moving average.

However, electromagnetic waves are emitted from transmission lines and the like of mains electricity, and sometimes these electromagnetic waves generate interference (interference noise) in electrostatic capacitance type touch sensors provided to vehicle steering wheels. Errors in detection readily arise in touch sensors due to changes in electrostatic capacitance and the like when interference is received.

Errors in detection due to interference can be suppressed in touch sensors by employing a filter to remove noise components. However, filters that employ electrical components such as resistors, capacitors, and the like to address mains electricity frequencies increase the size of electrical components, and are extremely difficult to install to a steering wheel.

An approach that might be considered in a touch sensor to address this issue is to employ a digital filter (a software filter) to remove interference caused by electromagnetic waves of particular frequency components. As a digital filter, a detection value from which interference has been removed can be obtained for interference caused by 50 Hz electromagnetic waves by, for example, computing as a segment average a measurement average value of each cycle for respective cycles, and outputting the segment averages.

However, electromagnetic waves emitted from transmission lines and the like not only vary according to vehicle travel, but the frequency also varies from 50 Hz to 60 Hz or from 60 Hz to 50 Hz according to the region travelled. There is accordingly an issue in touch sensors in that interference of a 60 Hz or 50 Hz frequency component is not able to be suppressed even if a 50 Hz or 60 Hz frequency component can be removed, respectively.

SUMMARY

In consideration of the above circumstances, an object of the present disclosure is to provide a touch detection device capable of suppressing a fall in detection accuracy arising due to differences in power source frequencies of transmission lines (mains electricity).

In order to achieve the above objective, a touch detection device of a first aspect of the present disclosure includes a steering body operated by an operator to steer a steering target, a sensor electrode provided to the steering body and configured to have an electrostatic capacitance changed by contact or close proximity of the operator to the steering body, and a measurement control section. The measurement control section is configured to measure the electrostatic capacitance of the sensor electrode over a measurement cycle according to a measurement frequency and to output a detection value according to values measured by setting the measurement frequency to 50 Hz or 60 Hz for removal target frequencies of 50 Hz and 60 Hz, to set the measurement cycle and a period for calculating a segment average of the measurement values based on the measurement frequency, to set an interval between adjacent averaging segments for calculating the segment average to an interval such that one segment average value is suppressed by another segment average value for 50 Hz and 60 Hz frequency components, and to output an averaged measurement value for the two averaging segments as the detection value.

A touch detection device of a second aspect of the present disclosure includes a steering body operated by an operator to steer a steering target, a sensor electrode provided to the steering body and configured to have an electrostatic capacitance changed by contact or close proximity of the operator to the steering body, and a measurement control section. The measurement control section is configured to measure the electrostatic capacitance of the sensor electrode over a measurement cycle according to a measurement frequency and to output a detection value according to values measured by setting the measurement frequency to a frequency lying between 50 Hz and 60 Hz for removal target frequencies of 50 Hz and 60 Hz, to set the measurement cycle and a period for calculating a segment average of the measurement values based on the measurement frequency, and to set an interval between adjacent averaging segments for calculating the segment average to an interval such that one segment average value is suppressed by another segment average value for 50 Hz and 60 Hz frequency components and to output an averaged measurement value for the two averaging segments as the detection value.

A touch detection device of a third aspect is the first or second aspect, wherein the measurement cycle is set to $Ta/2n$, wherein $Ta$ is the measurement frequency cycle and $n$ is a positive integer.

A touch detection device of a fourth aspect is any one of the first to third aspects, wherein the period for the segment averaging is set to a single cycle of the measurement frequency, and the interval between averaging segments is set to $Ta \cdot (2m+1)/2$, wherein $Ta$ is the measurement frequency cycle and $m$ is an integer of 0 or greater.

In the first aspect of the present disclosure the sensor electrode provided to the steering body operated by the operator to steer the steering target has an electrostatic capacitance that is changed by contact or close proximity of the operator to the steering body. The measurement control section measures the electrostatic capacitance arising in the sensor electrode over the measurement cycle according to the measurement frequency, and outputs the detection value according to the measured values.

Moreover, the measurement frequency is set in the measurement control section to one or other of 50 Hz or 60 Hz, which are power source frequencies of mains electricity, as the removal target frequency, and the measurement cycle, the period for calculating a segment average of the measurement values, and the interval between averaging segments for calculating the segment average are set based on the set measurement frequency, and an averaged measurement value for the two averaging segments is output as the detection value.

The measurement control section sets the interval between averaging segments for calculating the segment averages to an interval such that one segment average value is suppressed by another segment average value for 50 Hz and 60 Hz, frequency components. This means that for a frequency component different to the measurement frequency, for segment average values of the two averaging segments (values of segment average), one segment average value is positive and the other is negative, enabling power source frequency components to be suppressed from being included in the averaged measurement values of the segment average values for the two averaging segments, and enabling a fall in the detection accuracy caused by electromagnetic waves emitted from transmission lines to be suppressed from occurring.

In the second aspect the measurement frequency is set to a frequency lying between 50 Hz and 60 Hz for 50 Hz and 60 Hz removal target frequencies that are the power source frequencies of mains electricity. Moreover, in the measurement control section the interval between averaging segments for calculating the segment averages is set to an interval such that one segment average value is suppressed by another segment average value for 50 Hz and 60 Hz frequency components.

This accordingly means that, for each of the frequency components of 50 Hz and 60 Hz that are different to the measurement frequency, the segment average values for one of the two averaging segments is positive and the other thereof is negative, enabling the power source frequency components to be suppressed from being included in the averaged measurement value of the segment averages of the two averaging segments for each of the frequency components of 50 Hz and 60 Hz. This accordingly enables a fall in the detection accuracy caused by electromagnetic waves emitted from transmission lines to be suppressed from occurring for transmission lines of both 50 Hz and 60 Hz.

In the third aspect, the measurement cycle is set to Ta/2n, wherein Ta is the measurement frequency cycle and n is a positive integer. This accordingly enables power source frequency components to be efficiently suppressed from being included in the segment averages of the averaging segments due to the measurement values within the averaging segments including both positive regions and negative regions, enabling a fall in detection accuracy caused by electromagnetic waves emitted from transmission lines to be suppressed from occurring.

In the fourth aspect, the period for the segment averaging is set to the measurement frequency cycle, and the interval between averaging segments is set to Ta·(2m+1)/2, wherein Ta is the measurement frequency cycle and m is an integer of 0 or greater. This accordingly enables one of the segment average values for the two averaging segments to be made positive (a positive value) and the other thereof to be made negative (a negative value) effectively, enabling a fall in detection accuracy caused by electromagnetic waves emitted from transmission lines to be efficiently suppressed from occurring.

BRIEF DESCRIPTION OF THE DRAWINGS

Exemplary embodiments of the present disclosure will be described in detail based on the following figures, wherein.

DETAILED DESCRIPTION

Detailed description follows regarding an exemplary embodiment of the present disclosure, with reference to the drawings.

A steering device 10 according to the present exemplary embodiment includes a steering wheel 12 serving as a steering body. The steering wheel 12 is disposed at a vehicle front side of a seat (driver seat) where an occupant (driver) serving as an operator is seated while driving a vehicle serving as a steering target.

Figure 1:
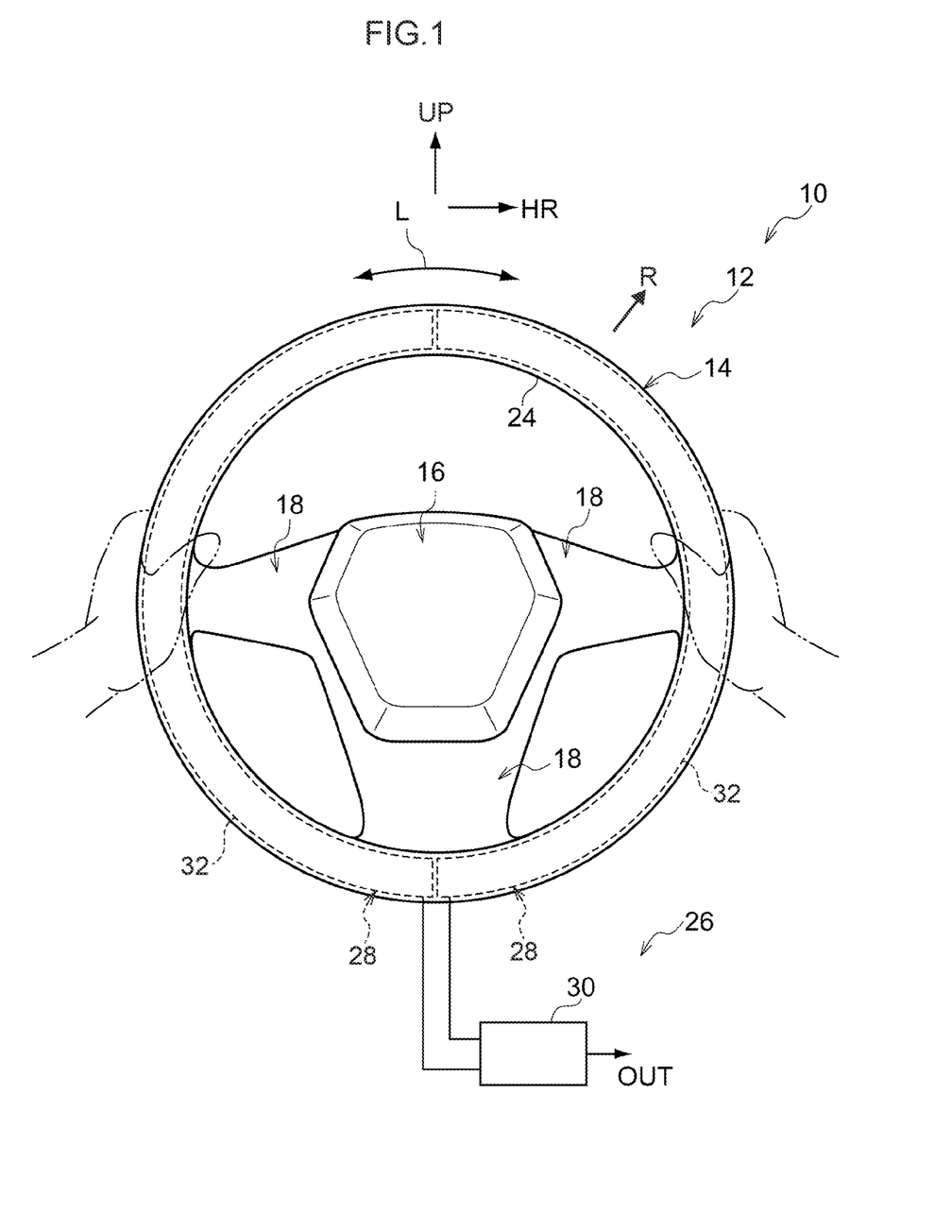
FIG. 1 is a face-on view of a steering wheel according to the present exemplary embodiment.
Figure 2:
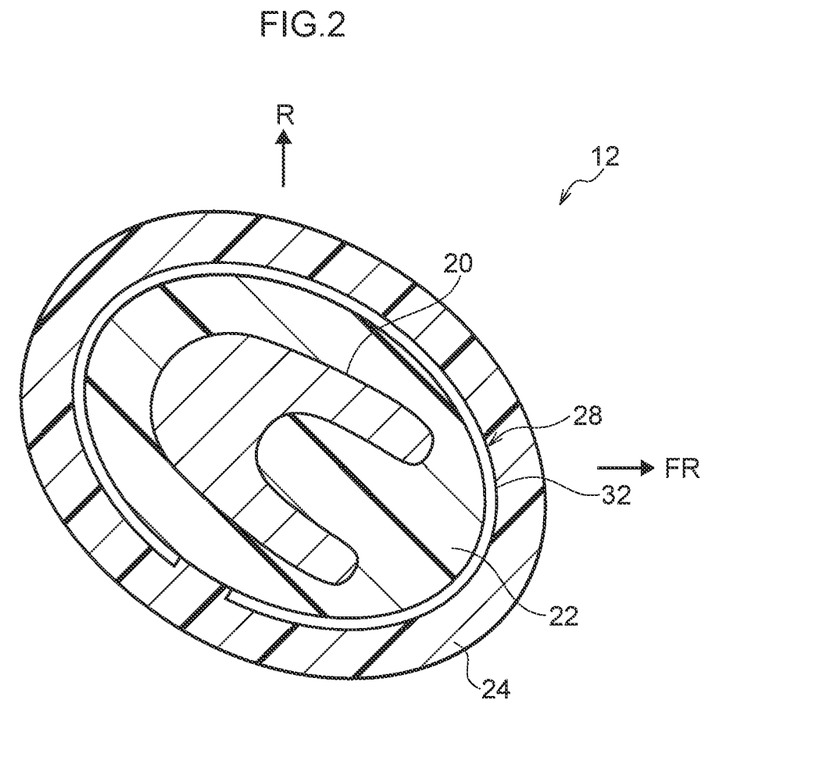
FIG. 2 is a cross-section of a rim section as viewed along a steering wheel circumferential direction.

FIG. 1 is a face-on view of the steering wheel 12 as viewed from a driver's side, and FIG. 2 illustrates relevant portions of the steering wheel 12 in a radial direction cross-section of the steering wheel 12 (a cross-section as viewed along a circumferential direction of the steering wheel 12). in the drawings the arrow FR indicates the vehicle front side, the arrow UP indicates a vehicle upper side, and the arrow HR indicates a vehicle width direction right side of the vehicle. in the drawings, the arrow R indicates a radial direction of the steering wheel 12, and the arrow L indicates a circumferential direction of the steering wheel 12.

As illustrated in FIG. 1, the steering wheel 12 is configured by a ring shaped rim section 14 serving as a grip section, a boss section 16 provided at a central portion, and stay sections 18. a core made from metal is provided in the steering wheel 12. the core is configured by a rim core portion 20 of the rim section 14 (see FIG. 2), a boss core portion of the boss section (not illustrated in the drawings), and stay core portions of the stay sections 18 (not illustrated in the drawings), with the rim core portion 20 formed in an annular shape (ring shape). in the steering wheel 12 the rim core portion 20 and the boss core portion are coupled together by the stay core portions, the steering wheel 12 has a frame formed by the core, and the rim section 14, the boss section 16, and the stay sections 18 integrated together by the core.

The steering device 10 includes a steering shaft (not illustrated in the drawings), and the steering shaft has an axial direction along a vehicle front-rear direction and is rotatably supported by the vehicle body. in the steering wheel 12 the boss core portion of the boss section 16 is fixed to a vehicle rear side end of the steering shaft, and the steering wheel 12 is supported by the steering shaft and is able to rotate integrally with the steering shaft.

Thus the steering shaft is rotated and the vehicle steered by rotation operation of the steering wheel 12. Note that the steering wheel 12 is illustrated in FIG. 1 at a rotation position causing the vehicle to proceed straight ahead (a straight ahead steering position).

As illustrated in FIG. 2, the rim section 14 is formed with a substantially circular shape (or substantially elliptical shape) in a cross-section taken along the steering wheel 12 radial direction, with a base 22 formed in a circular ring shape using a resin material, such as urethane or the like, disposed inside the rim section 14 and serving as an insulator material. in the rim section 14 the rim core portion 20 is housed inside the base 22 by insert molding, with the rim core portion 20 covered by the base 22.

A decorative portion 24 serving as a contact portion is also disposed at an outer peripheral portion of the base 22, and the entire steering wheel 12 radial direction cross-section periphery of the base 22 and the entire steering wheel 12 circumferential direction (all areas) of the base 22 are covered by the decorative portion 24. the resin material serving as the insulator material, such as urethane or the like, is employed for the decorative portion 24, with the rim section 14 of the steering wheel 12 decorated by the decorative portion 24. Note that the decorative portion 24 may be made from leather or the like by employing tanned leather or the like.

As illustrated in FIG. 1, a touch detection device (contact detection device) 26 is provided to the steering device 10. the touch detection device 26 is employed in a vehicle or the like that is capable of traveling in a self-driving mode without intervention of driving operations by a driver, and is employed to detect whether or not the steering wheel 12 is being gripped (grasped) by the driver, whether or not the fingers etc. of the driver are contacting the steering wheel 12, and the like.

Figure 3:
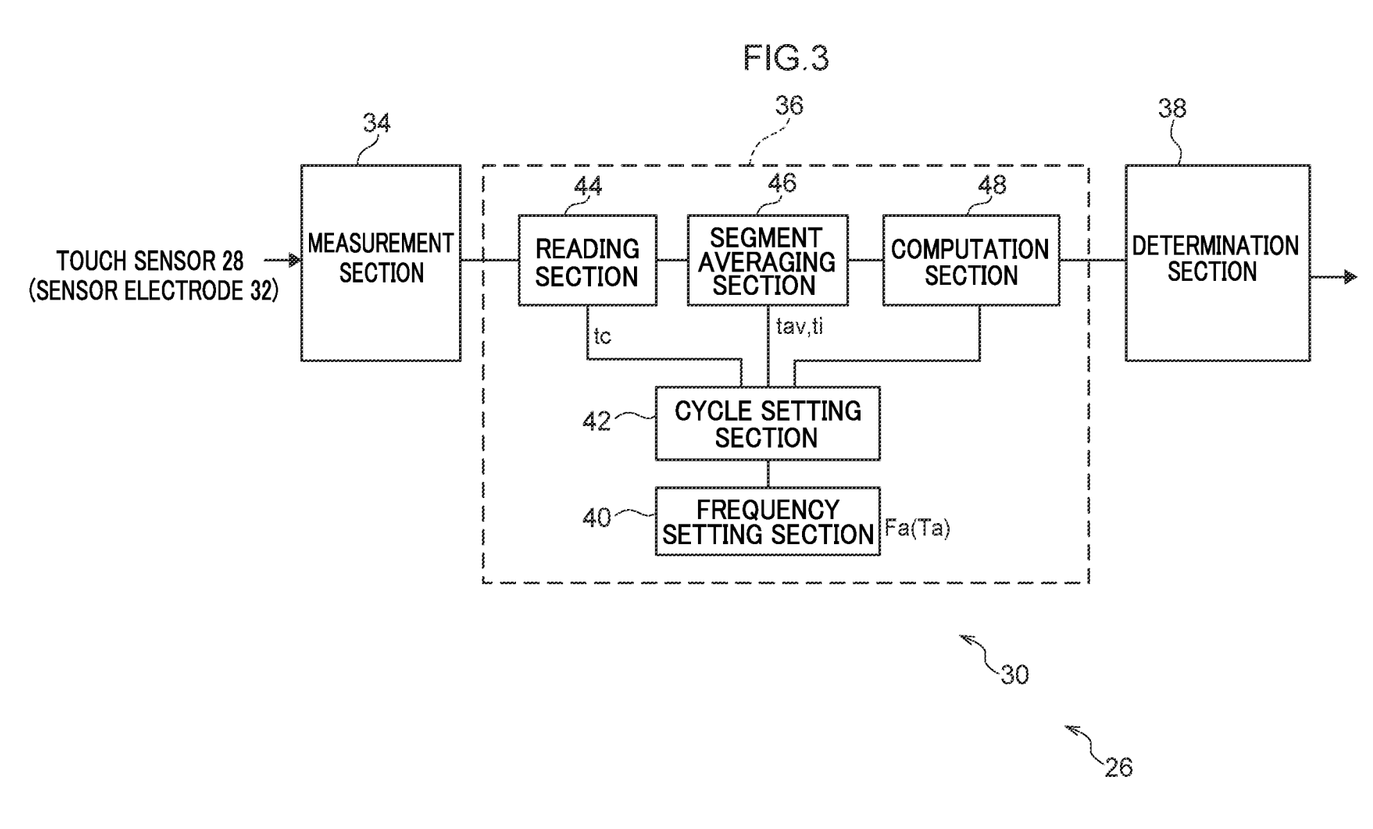
FIG. 3 is block diagram illustrating relevant portions of a touch detection device.

The touch detection device 26 is a self-capacitive device, and the touch detection device 26 includes a sensor ECU 30 configured by touch sensors 28 and a measurement control section. FIG. 3 is a block diagram illustrating a schematic configuration of the sensor ECU 30.

As illustrated in FIG. 2, the touch sensors 28 each include a sensor electrode 32, with the sensor electrodes 32 each formed in a substantially band shape from a conductive material that has a sheet shape or a film shape. Note that the touch sensors 28 may apply a known configuration, such as a configuration employing a shield electrode formed similarly to the sensor electrode 32 in a substantially band shape from an insulator material, with the sensor electrode 32 disposed on one face of the band shaped insulator material and the shield electrode disposed on the other face thereof the sensor electrode 32 of the touch sensor 28 (and similarly, the shield electrode too) may be configured by employing a conductive fabric having a conductive material such as a metal adhered to a front face of a stretchable woven fabric woven with warp threads and well threads.

As illustrated in FIG. 1, in the touch detection device 26, the length direction of the touch sensors 28 (the sensor electrodes 32) is disposed along the steering wheel 12 circumferential direction, with each of the touch sensors 28 disposed in the rim section 14 over respective substantially half circumferential ranges in the steering wheel 12 circumferential direction. As illustrated in FIG. 2, the touch sensors 28 are configured with each of the sensor electrodes 32 disposed at the rim section 14 radial direction outside and with a width direction along the rim section 14 peripheral direction, and with the sensor electrodes 32 wrapped around substantially the entire outer periphery of the base 22.

Thus the touch sensors 28 are wrapped onto the outer peripheral face of the base 22 so as to span substantially the entire periphery in the steering wheel 12 circumferential direction and in the rim section 14 peripheral direction, and the touch sensors 28 are covered with the decorative portion 24. Moreover, the two touch sensors 28 are electrically isolated from each other, with one on the vehicle right side and the other on the vehicle left side when the steering wheel 12 is in a straight ahead steering position.

The sensor ECU 30 in the touch detection device 26 is disposed on the steering wheel 12 (on the boss section 16, for example). Each of the touch sensors 28 is electrically connected to the sensor ECU 30, and the sensor ECU 30 measures the electrostatic capacitances (electrostatic capacitance values) of the touch sensors 28, and measures changes to these electrostatic capacitances. Note that the two touch sensors 28 and measurement of the electrostatic capacitance of the touch sensors 28 by the sensor ECU 30 are similar for the two touch sensors 28, and so a configuration corresponding to one of the touch sensors 28 will be described below.

As illustrated in FIG. 3, the sensor ECU 30 is configured including a measurement section 34 for measuring the electrostatic capacitance of the touch sensor 28, and a control section 36 serving as a measurement control section for controlling the measurement section 34 and outputting a detection value corresponding to the measured electrostatic capacitance (a signal corresponding to the detection value). the measurement section 34 measures a voltage corresponding to the electrostatic capacitance of each of the touch sensors 28 and outputs signals corresponding to the measured voltage. Note that a known configuration may be applied to detect the electrostatic capacitance of the touch sensor 28 and to detect the voltage corresponding to the electrostatic capacitance.

A determination section 38 may also be provided to the sensor ECU 30. the determination section 38 determines, for both the vehicle left side and the vehicle right side of the steering wheel 12 (the rim section 14), whether or not the driver has grasped or whether or not the driver is touching the steering wheel 12 by determination from a pre-set threshold and detection values of the electrostatic capacitances of the touch sensors 28, or from changes to the electrostatic capacitances.

The sensor ECU 30 includes a central processing unit (CPU), memory such as read only memory (ROM) and random access memory (RAM), and non-volatile storage such as a solid state drive (SSD) (not illustrated in the drawings). in the sensor ECU 30, the CPU reads a measurement program stored on the ROM or storage, expands the measurement program into the RAM, and executes the program. Each of the functions of the measurement section 34, the control section 36, and the determination section 38 are thereby implemented in the sensor ECU 30.

A frequency setting section 40, a cycle setting section 42, a reading section 44, a segment averaging section 46, and a computation section 48 are provided in the control section 36. Each of the functions of the frequency setting section 40, the cycle setting section 42, the reading section 44, the segment averaging section 46, and the computation section 48 are implemented in the sensor ECU 30 by execution of the program stored in the storage.

In the sensor ECU 30, a 50 Hz frequency component serving as a first target frequency and a 60 Hz frequency component serving as a second target frequency, these being power source frequencies of transmission lines (power source frequencies of mains electricity), are both removed as noise components from measurement values of electrostatic capacitance of the touch sensors 28 of the control section 36.

In the frequency setting section 40 of the control section 36, one or other from out of 50 Hz or 60 Hz is set as a measurement frequency Fa, and a signal of the set measurement frequency Fa is output (emitted) by the frequency setting section 40. in the cycle setting section 42, a measurement cycle tc that is a cycle for measuring the electrostatic capacitance of the touch sensor 28 is set from a cycle Ta of the measurement frequency Fa. in the control section 36. the measurement cycle tc is set as tc=Ta/2n (wherein n is a positive integer) such that measurement is performed two or more times for each cycle of the measurement frequency Fa.

Moreover, in the touch detection device 26 an average value of measurement values within each averaging segment (i.e. a segment average) is employed as the electrostatic capacitance measurement value for each of the touch sensors 28. a period of the averaging segments (averaging period) tav is set in the cycle setting section 42 based on the cycle Ta, and the averaging period tav is set in the cycle setting section 42 as the cycle Ta (tav=Ta) in this example.

Moreover, the segment averages are computed in the touch detection device 26 at specific time intervals such that the averaging periods tav for computing the segment averages are not contiguous, and an averaging interval ti, which is an interval (time) between two adjacent averaging segments, is set in the touch detection device 26. the interval set as the averaging interval ti is an interval such that, for frequency components of 50 Hz and 60 Hz, the segment average of one segment is able to be suppressed by the segment average for another thereof in the touch detection device 26 an odd number multiple of ½ the measurement frequency Fa (half cycles) is applied as this averaging interval tav.

Namely, the averaging interval ti is set to ti=Ta·(2m+1)/2 from the cycle Ta of the measurement frequency Fa. Wherein m is an integer of 0 or greater. m is preferably a small value from the perspective of shortening the output interval (output cycle) of the detection values.

The reading section 44 uses the measurement section 34 to measure the electrostatic capacitance of the touch sensor 28 at the measurement cycle tc, and reads and outputs the measurement values to the segment averaging section 46. a segment average $Q_k$ is computed in the segment averaging section 46 by averaging the measurement values within the averaging period tav. the segment averaging section 46 performs the computation of the segment average $Q_k$ at the averaging interval ti cycle.

When input with a new segment average $Q_k$ from the segment averaging section 46, the computation section 48 computes an average value of the input segment average $Q_k$ and the previous segment average $Q_{k-1}$, and outputs the computed value (averaged measurement value) as a detection value corresponding to the electrostatic capacitance of the touch sensor 28.

Description next follows of the operation of the present exemplary embodiment.

When steering a vehicle, a driver grips the steering wheel 12 (the rim section 14) and performs a rotation operation thereon, in the steering device 10 the touch sensors 28 (sensor electrodes 32) of the touch detection device 26 are disposed on the steering wheel 12, and the electrostatic capacitance of the touch sensors 28 is changed by the driver grasping and touching the steering wheel 12.

The sensor ECU 30 of the touch detection device 26 measures the electrostatic capacitance of the touch sensors 28, and is able to determine whether the driver has gripped (or touched) the steering wheel 12 from the measured electrostatic capacitances or from changes to the electrostatic capacitances.

Alternating power is transmitted in transmission lines of mains electricity at a power source frequency of 50 Hz or 60 Hz and at a specific voltage (low voltage, high voltage, or extra-high voltage), with the transmission lines causing electromagnetic waves to be emitted according to the power source frequency. a vehicle receives electromagnetic waves (is affected by electromagnetic waves) emitted from transmission lines when there are transmission lines strung in the vehicle travel environment.

The touch detection device 26 includes the touch sensors 28 each disposed around approximately half a circumference of the steering wheel 12. Due to the touch sensors 28 being affected by the electromagnetic waves emitted from the transmission lines, a noise component corresponding to the power source frequency is superimposed as interference on the measurement values of electrostatic capacitance of the touch sensors 28.

The control section 36 of the sensor ECU 30 reads the measurement values of electrostatic capacitance of the touch sensors 28 measured by the measurement section 34 using the measurement cycle tc. the control section 36 calculates the segment average $Q_k$ by averaging the measurement values within the averaging period tav. the control section 36 also calculates the segment average $Q_k$ at each of the averaging intervals ti. Furthermore, when a new segment average $Q_k$ is calculated, the control section 36 computes an averaged measurement value by taking an average of the calculated segment average $Q_k$ and segment average $Q_{k-1}$ of the previous segment average, and outputs the computed averaged. measurement value as the detection value.

A measurement frequency Fa is set in the sensor ECU 30, and the measurement cycle tc, the averaging period tav, and the averaging interval ti are all set based on the cycle Ta of the measurement frequency Fa. the measurement cycle tc is set at tc=Ta/2n (wherein n is a positive integer), the averaging period tav is set at tav=Ta, and the averaging interval ti is set at ti=Ta·(2m+1)/2 (wherein m is an integer of 0 or greater).

Consider an example of the sensor ECU 30 having a measurement frequency Fa=50 Hz (cycle Ta=20 ms) and n=4 to give a measurement cycle tc (tc=Ta/8=2.5 ms), an averaging period tav=Ta=20 ms, and m=3 to give an averaging interval ti=Ta·(2m+1)/2=70 ms.

Figure 4:
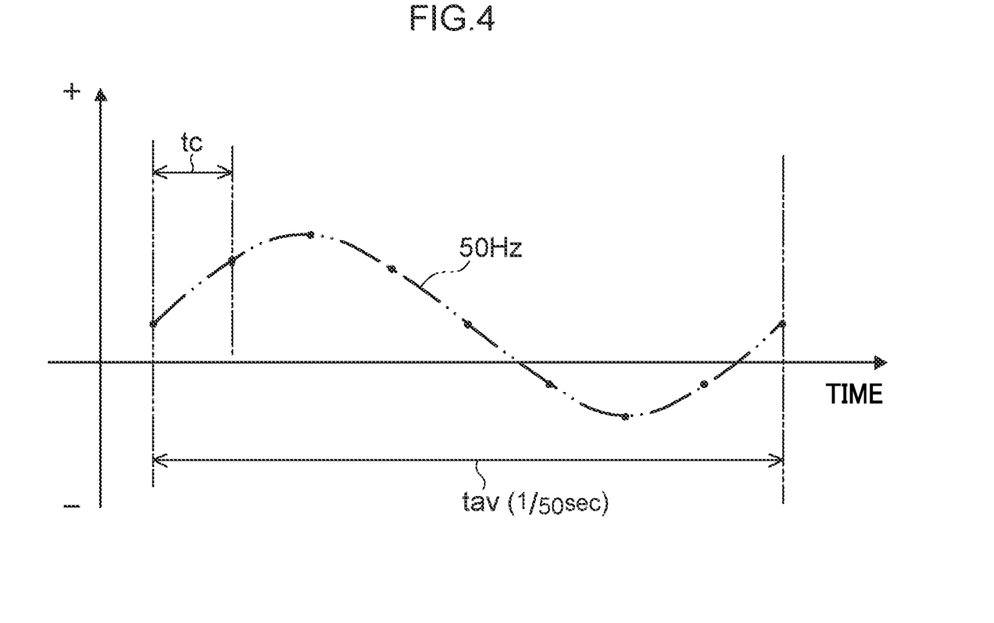
FIG. 4 is a graph schematically illustrating measurement values of signal components of the same frequency as a measurement frequency Fa.

FIG. 4 illustrates a graph for an example of simulation results for removing signal components at 50 Hz frequency, the same as the measurement frequency Fa, for results with these settings in the sensor ECU 30. Note that the horizontal axis in FIG. 4 represents time, and the relative magnitude of signal components, corresponding to measurement values, is shown on the vertical axis. FIG. 4 also illustrates only the 50 Hz frequency component.

As illustrated in FIG. 4, the noise component caused by electromagnetic waves at frequency 50 Hz emitted from the transmission lines changes with a substantially sinusoidal waveform having a cycle the same as the cycle Ta. Thus an average value of the measurement values over each averaging period tav=20 ms is approximately 0. the sensor ECU 30 is thereby able to remove the frequency components at the power source frequency 50 Hz that is the same as the measurement frequency Fa, enabling gripping (contacting) to be detected at high accuracy using the touch sensors 28 in regions strung with transmission lines having a power source frequency the same as the measurement frequency Fa.

Figure 5:
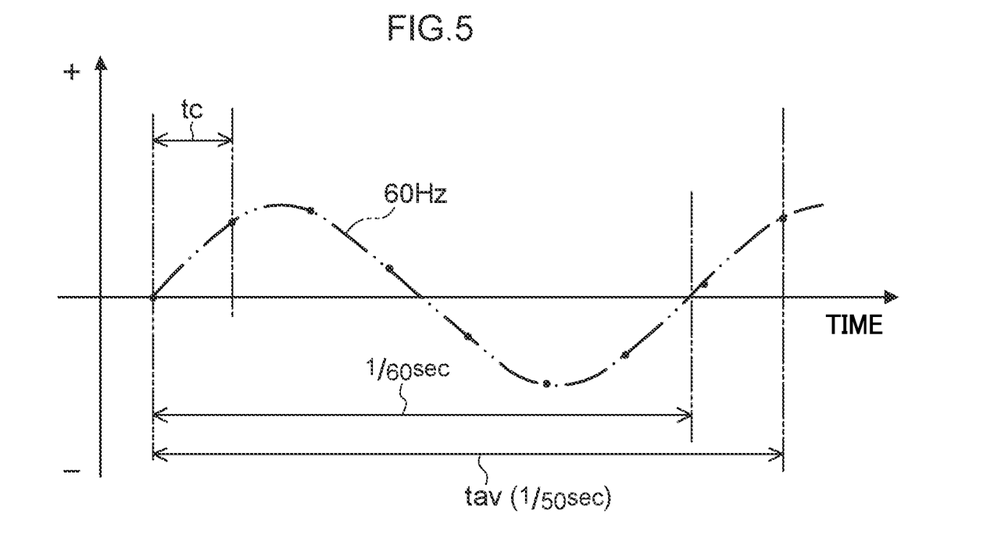
FIG. 5 is a graph schematically illustrating measurement values of signal components of a different frequency to the measurement frequency Fa.
Figure 6A:
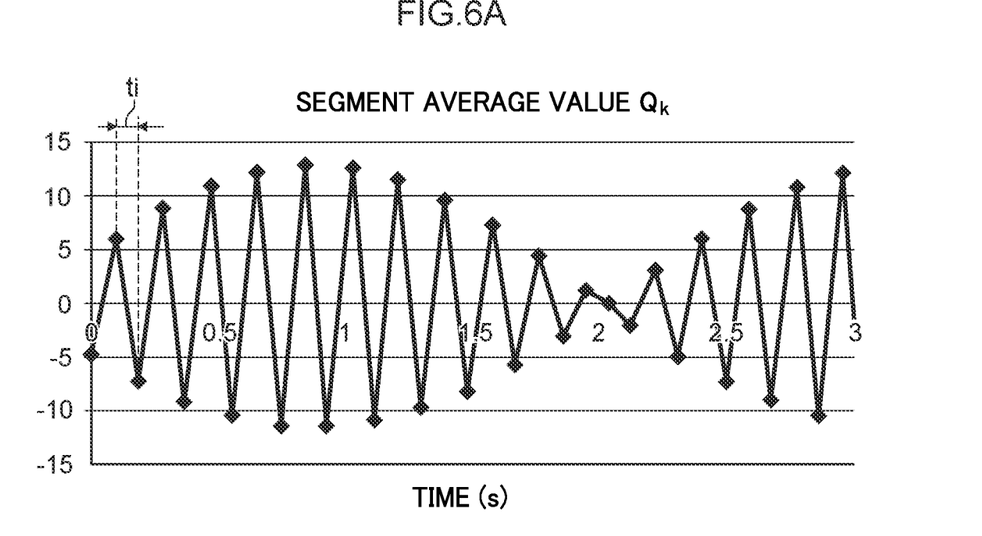
FIG. 6A is a graph illustrating an example of changes in segment averages.
Figure 6B:
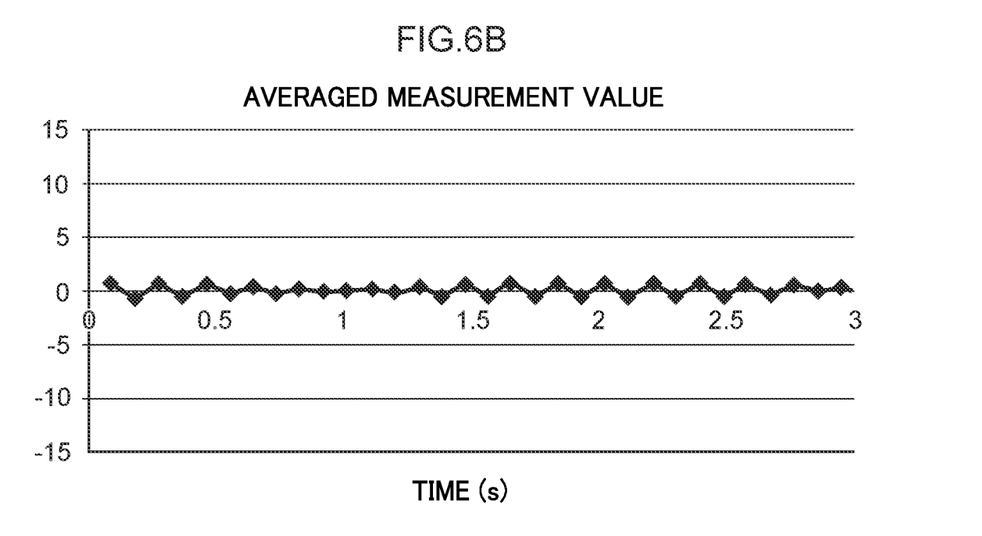
FIG. 6B is a graph illustrating an example of changes in an averaged measurement value.

However, FIG. 5, FIG. 6A, and FIG. 6B illustrate graphs for examples of simulation results for removing a signal component (noise component) at 60 Hz frequency for the sensor ECU 30 with the settings described above. FIG. 5 illustrates a graph for an example of simulation results of measured signal components of 60 Hz frequency that is different to the measurement frequency Fa, FIG. 6. A schematically illustrates an output of the segment averaging section 46 (segment average $Q_k$), and FIG. 6B schematically illustrates an output of the computation section 48 (control section 36) (averaged measurement value). in each graph the horizontal axis represents time, and the relative magnitude of the signal component, corresponding to the measurement value, is shown on the vertical axis, with only the 60 Hz frequency component thereof illustrated.

As illustrated in FIG. 5, a noise component caused by frequency 60 Hz electromagnetic waves emitted from transmission lines changes in a substantially sinusoidal waveform having a cycle shorter than cycle Ta. Thus averaging period tav=20 ms is a longer period that one cycle of the noise component, resulting in part of the noise component falling after one cycle also appearing in the segment average $Q_k$.

The segment average $Q_k$ of the measurement values accordingly changes for each averaging segment, as illustrated in FIG. 6A. This would result in the noise component not being suppressed were the segment averages $Q_k$ to be sequentially computed from the measurement values of the touch sensors 28 and output, resulting in detection errors readily arising in touch detection using the touch sensor 28.

In order to address this issue, the sensor ECU 30 employs an odd number multiple of half cycles of cycle Ta for the averaging interval ti, this being the time interval between averaging segments. Thus the noise component frequency is 60 Hz against the measurement frequency Fa=50 Hz, and the waveform of the noise component changes in the opposite direction when shifted by an odd number multiple of half cycles of the cycle Ta, which is the measurement frequency Fa. Namely, for a waveform that changes from being convex upward (+ side) to convex downward (− side), the waveform shifted by the cycle Ta changes from being convex downward (− side) to being convex upward (+ side). Thus, as illustrated in FIG. 6A, the segment average $Q_k$ of the measurement values changes to being alternately on the + side and on the − side, and between the segment averages $Q_k$, $Q_{k-1}$, one value thereof is able to suppress the other value thereof.

Thus the 60 Hz noise component is suppressed in the measurement average value of the segment average $Q_k$ and the segment average $Q_{k-1}$, as illustrated in FIG. 6B. the sensor ECU 30 is accordingly able to suppress the noise component at 60 Hz even when the measurement frequency Fa is 50 Hz, enabling gripping (contacting) to be detected at high accuracy using the touch sensors 28 even in regions strung with transmission lines having a power source frequency different from the measurement frequency Fa.

The touch detection device 26 is accordingly able to suppress the noise component received from transmission lines transmitting power at 50 Hz using the measurement frequency Fa of 50 Hz, enabling touch detection to be performed at high accuracy.

Moreover, by setting the measurement cycle tc and the averaging period tav based on the cycle Ta of the measurement frequency Fa and also setting the averaging interval ti to an odd number multiple of half cycles of the cycle Ta, the touch detection device 26 is also able to suppress the noise component received from transmission lines transmitting power at 60 Hz, enabling touch detection at high accuracy.

Note that although the present exemplary embodiment was described above for a measurement frequency Fa of 50 Hz, the measurement frequency Fa may be 60 Hz. Using a measurement frequency Fa of 60 Hz enables the noise component received from transmission lines transmitting power at 60 Hz to be suppressed and also enables the noise component received from transmission lines transmitting power at 50 Hz to be suppressed, thereby enabling noise components emitted from transmission lines to be removed irrespective of the transmission line power source frequency and enabling touch detection to be performed at high accuracy.

In the present exemplary embodiment the measurement frequency Fa is 50 Hz or 60 Hz. However, the measurement frequency Fa may be any frequency lying between 50 Hz and 60 Hz (50 Hz<Fa<60 Hz). for example, in cases in which the measurement frequency Fa is set at 55 Hz, the frequency difference can be made small between the measurement frequency Fa and both 50 Hz and 60 Hz, enabling the segment average $Q_k$ to be made smaller than cases of larger frequency differences.

Moreover, when the measurement frequency Fa is set at 55 Hz, the 60 Hz noise component can be suppressed more than when the measurement frequency Fa is set at 50 Hz, and the 50 Hz noise component can be suppressed more than when the measurement frequency Fa is set at 60 Hz. a fall in the accuracy of touch detection arising when 50 Hz and 60 Hz noise components are not able to be removed can accordingly be suppressed from occurring by setting the measurement frequency Fa to any frequency lying between 50 Hz and 60 Hz.

Furthermore, although the averaging interval ti was set to a cardinal number of times the cycle Ta in the present exemplary embodiment, the averaging interval ti may be any interval capable of suppressing one value of the segment averages $Q_k$, $Q_{k-1}$ using the other value for 50 Hz and 60 Hz frequency components.

Note that although a face-on view ring shape was applied for the steering wheel 12 in the present exemplary embodiment described above, there is no limitation to a ring shape, and a steering body may be employed having any freely selected shape enabling an operator to steer a vehicle by gripping and operating the steering body.

What is claimed is:

1. A touch detection device comprising:
   a steering body operated by an operator to steer a steering target;
   a sensor electrode provided at the steering body and having an electrostatic capacitance that is changed by contact or close proximity of the operator to the steering body; and
   a measurement control section configured to:
   measure the electrostatic capacitance of the sensor electrode over a measurement cycle according to a measurement frequency and to output a detection value according to values measured by setting the measurement frequency to 50 Hz or 60 Hz for removal target frequencies of 50 Hz and 60 Hz,
   set the measurement cycle and a period for calculating a segment average of the measurement values based on the measurement frequency, and
   set an interval between adjacent averaging segments for calculating the segment average such that one segment average value is suppressed by another segment average value for 50 Hz and 60 Hz frequency components, and output an averaged measurement value for the two averaging segments as the detection value.

2. A touch detection device comprising:
a steering body operated by an operator to steer a steering target;
a sensor electrode provided at the steering body and having an electrostatic capacitance that is changed by contact or close proximity of the operator to the steering body; and
a measurement control section configured to:
   measure the electrostatic capacitance of the sensor electrode over a measurement cycle according to a measurement frequency and to output a detection value according to values measured by setting the measurement frequency to a frequency lying between 50 Hz and 60 Hz for removal target frequencies of 50 Hz and 60 Hz,
   set the measurement cycle and a period for calculating a segment average of the measurement values based on the measurement frequency, and
   set an interval between adjacent averaging segments for calculating the segment average such that one segment average value is suppressed by another segment average value for 50 Hz and 60 Hz frequency components, and output an average measurement value for the two averaging segments as the detection value.

3. The touch detection device of claim 1, wherein the measurement cycle is set to $Ta/2n$, Ta being a measurement frequency cycle and n being a positive integer.

4. The touch detection device of claim 1, wherein the period for the segment averaging is set to a single cycle of the measurement frequency, and the interval between averaging segments is set to $Ta \cdot (2m+1)/2$, Ta being a measurement frequency cycle and m being an integer of 0 or greater.

* * * * *